(12) United States Patent
Tsuge et al.

(10) Patent No.: US 6,386,342 B1
(45) Date of Patent: May 14, 2002

(54) STAINLESS STEEL FOR A DISC BRAKE ROTOR

(75) Inventors: Shinji Tsuge, Nishinomiya; Takaaki Matsuda, Amagasaki; Yasutaka Okada, Nara; Tsuyoshi Sakashita, Kobe; Daisuke Nago, Sakai, all of (JP)

(73) Assignees: Sumitomo Metal Industries, Ltd., Osaka; Shimano Inc., Sakai, both of (JP)

( * ) Notice: Subject to any disclaimer, the term of this patent is extended or adjusted under 35 U.S.C. 154(b) by 0 days.

(21) Appl. No.: 09/971,594

(22) Filed: Oct. 9, 2001

(30) Foreign Application Priority Data

Oct. 18, 2000 (JP) .............................. 12-323320

(51) Int. Cl.$^7$ .............................................. F16D 65/10
(52) U.S. Cl. ................................ 188/218 XL; 148/325
(58) Field of Search .................. 188/218 XL; 148/325; 420/60, 61

(56) References Cited

U.S. PATENT DOCUMENTS

| | | | |
|---|---|---|---|
| 4,166,521 A | * 9/1979 | Okunishi et al. | 188/218 XL |
| 4,878,955 A | * 11/1989 | Hoshimo et al. | 148/325 |
| 5,017,246 A | * 5/1991 | Miyasaka et al. | 148/325 |
| 5,089,067 A | * 2/1992 | Schumacher | 148/325 |
| 5,261,511 A | * 11/1993 | Libsch et al. | 188/218 XL |
| 5,462,611 A | * 10/1995 | Uematsu et al. | 148/325 |
| 5,979,614 A | * 11/1999 | Takahashi et al. | 188/218 XL |
| 6,294,131 B1 | * 9/2001 | Jaffrey | 148/325 |
| 6,299,704 B1 | * 10/2001 | Igarashi et al. | 148/325 |

FOREIGN PATENT DOCUMENTS

| JP | 3-79426 | 4/1986 |
|---|---|---|
| JP | 10-152760 | 6/1998 |

* cited by examiner

Primary Examiner—Christopher P. Schwartz
Assistant Examiner—Devon Kramer
(74) Attorney, Agent, or Firm—Burns, Doane, Swecker & Mathis, LLP

(57) ABSTRACT

A martensitic stainless steel for a disc brake rotor includes, in mass percent,

C: 0.04–0.10%, Si: at most 1.0%, Mn: 0.1–2.0%,

P: at most 0.04%, S: at most 0.01%, Cr: greater than 11.5 to 13.5%,

Al: at most 0.1%, N: at most 0.04%, Cu: 0–1.0%,

Ni: 0–1.0%, Ti: 0–0.03% and one or more of

Nb: 0.01–0.08% and V: 0.05–0.5%, with the value of GP expressed by the following formula being at least 50 (%):

$$GP(\%) = 700C(\%) + 800N(\%) + 20Ni(\%) + 10[Cu(\%) + Mn(\%)] - 6.2Cr(\%) - 9.2Si(\%) - 9.3Mo(\%) - 14V(\%) - 74.4Ti(\%) - 37.2Al(\%) + 63.2.$$

13 Claims, 2 Drawing Sheets

STAINLESS STEEL FOR A DISC BRAKE ROTOR

BACKGROUND OF THE INVENTION

1. Field of the Invention

This invention relates to a martensitic stainless steel suitable for use in manufacturing a disc brake rotor. A disc brake rotor formed from the steel can stably function under the severe conditions of a surface temperature which may reach 500–550° C. due to the heat generated during braking while maintaining an excellent hardness, toughness, and corrosion resistance. The steel can also be manufactured using a wide range of soaking temperatures and cooling speeds.

In particular, the present invention provides a martensitic stainless steel which can be used to form a disc brake rotor which has excellent properties even when the steel is hardened with a cooling speed slower than air cooling.

2. Description of the Related Art

In the past, a martensitic stainless steel such as SUS 403, 410, or a 420 type referred to as a "13% Cr steel" having a hardness adjusted to $H_RC$ 30–45 was used as a disc brake rotor for a motorcycle (herebelow, percent when used to express proportions of components refers to mass percent).

The reason why the hardness of a disc brake rotor is adjusted to the above-described range is that if the hardness of a disc brake rotor is too low, the wear resistance necessary for a disc brake rotor is not obtained, while if the hardness is made too high due to consideration only of wear resistance, the hardness has an adverse effect on braking stability.

Thus, a prescribed hardness after hardening is necessary for a material for a disc brake rotor, but at the same time, it is necessary for the material to have excellent properties, such as corrosion resistance, toughness, and stability with respect to its hardness after hardening, and the like. Stability here refers to the ability of the steel to obtain a certain level of hardness without regarding a change in cooling speed.

Stability is important because the surface of a disc brake rotor may rise to a high temperature of 500° C. or above due to the heat generated during braking. At such temperatures, a reaction between the surface of the disc brake rotor and the brake pads or an oxidation reaction between the surface of the disc brake rotor and the atmosphere becomes a problem, and in addition, there is a tendency for changes in material properties such as softening of the rotor or a decrease in corrosion resistance to occur.

A disc brake rotor requires a high degree of flatness. In recent years, therefore, it has become desired to perform hardening with a cooling temperature which is slower than air cooling in order to minimize the occurrence of strains during hardening, which could affect flatness.

In order to increase productivity, it is common to carry out hardening treatment by stacking a large number of disc brake rotors on top of each other. Performing hardening in this manner also leads to a decrease in cooling speed.

However, with a conventional material for a disc brake rotor, corrosion resistance and toughness deteriorated when hardening was performed at a low cooling speed.

Japanese Published Unexamined Patent Application No. Hei 10-152760 discloses a material having improved properties required of a disc brake rotor. This material is a martensitic stainless steel containing 0.5–2.5% of Cu in order to expand the possible temperature range for hardening and to suppress softening caused by heat generated during braking. That steel has an excellent resistance to softening such that a material adjusted to have a hardness of approximately $H_RC$ 35 undergoes a decrease in hardness of less than 10 when subjected to heat treatment at 600° C.×10 minutes, which simulates tempering occurring during braking. Therefore, the material is said to be able to prevent a decrease in braking force.

However, that publication does not take into consideration a decrease in corrosion resistance due to a slow cooling speed during hardening at the time of rotor manufacture or a decrease in corrosion resistance caused by temper softening, which occurs to a certain extent during use (due to increased temperatures during braking), so it is thought that the above-described steel leaves room for improvements with respect to these characteristics.

Japanese Published Examined Patent Application Hei 3-79426 discloses a technique in which corrosion resistance is guaranteed by adding 0.05–0.5% of Mo while reducing the Cr content to 10.0–11.5%, and if necessary adding 0.04–0.1% of Nb as a proposal for improving corrosion resistance of a martensitic stainless steel for a disc brake rotor.

Mo increases the corrosion resistance of stainless steel in an additive manner. It has a smaller tendency to form carbides than does Cr, so it is added in order to suppress a deterioration in corrosion resistance due to precipitation of carbides. However, Mo is expensive, so the martensitic stainless steel described in the above-described Japanese Published Examined Patent Application Hei 3-79426 is not completely satisfactory with respect to costs.

Thus, there is still a need for further improvements in the stability of the properties of a steel for a disc brake rotor in order to provide a disc brake rotor of greater reliability.

As described above, in a conventional material for a disc brake rotor, if hardening at a slow cooling speed is carried out in order to decrease strains or to permit a large number of discs to be stacked on top of each other during hardening to improve productivity, the corrosion resistance and toughness of the steel decrease.

In addition, a deterioration in material properties (a decrease in hardness, a deterioration in corrosion resistance) due to the high temperatures to which the steel is exposed during use (at the time of braking) easily occur, so conventional materials have problems with respect to the reliability of the resulting disc brake rotor.

SUMMARY OF THE INVENTION

Accordingly, an object of this invention is to provide an inexpensive steel for a disc brake rotor which has a satisfactory hardness after hardening, toughness, and corrosion resistance and which undergoes almost no changes in material properties (decrease in hardness, deterioration in corrosion resistance) due to high temperatures during use (at the time of braking), and which can be manufactured using a wide range of soaking temperatures and cooling speeds at the time of hardening.

Another object of the present invention is to provide a disc brake rotor made from such a steel, and a vehicle equipped with such a disc brake rotor.

The present inventors evaluated the hardness, the corrosion resistance, and the toughness of a cold rolled steel plate made from 13% Cr martensitic stainless steel which contained various amounts of C and which was subjected to hardening, i.e., cooling from a temperature in the range of 900–1050° C. and tempering in the range of 200–600° C., and they made the following discoveries.

(a) When the cooling speed during hardening falls below a speed of 5° C. per second corresponding to air cooling, the as-hardened corrosion resistance of the steel decreases. This decrease in corrosion resistance becomes more marked as the C content of the steel increases.

(b) When the cooling speed is reduced to 0.5° C. per second, if the C content of the steel is reduced to 0.1% or less, a fairly good corrosion resistance is obtained compared to a material having a comparatively high C content. Even so, the corrosion resistance of the steel is not improved to the level of an air cooled material.

(c) If the Cr content of the steel is made to exceed 11.5%, minute amounts of Nb or V are added, and the overall content in the steel of C, N, Ni, Cu, Mn, Cr, Si, Mo, V, Ti, and Al is adjusted, the corrosion resistance resulting from gradual cooling at a speed of 0.5° C. per second at the time of hardening is markedly improved.

In order to clarify the effects of guaranteeing the stability of an excellent corrosion resistance under the conditions of a slow cooling speed at the time of hardening, it is necessary to perform control such that the structure at a high temperature has a high austenite ratio. For this purpose, it is necessary to adjust the overall content in the steel of C, N, Ni, Cu, Mn, Cr, Si, Mo, V, Ti, and Al. In particular, it is necessary to adjust the composition of the steel such that the value of GP given by the following formula is at least 50 (%):

$$GP(\%) = 700C(\%) + 800N(\%) + 20Ni(\%) + 10[Cu(\%) + Mn(\%)] - 6.2Cr(\%) - 9.2Si(\%) - 9.3Mo(\%) - 14V(\%) - 74.4Ti(\%) - 37.2Al(\%) + 63.2.$$

(d) The toughness of steel has a tendency to increase as the hardness after hardening decreases. In order to guarantee a high toughness while maintaining hardness after hardening with gradual cooling, it is advantageous to add Nb and V, which control the precipitation of Cr carbo-nitrides, and to adjust the chemical composition so that GP has a value of at least 50 (%).

(e) A hardened steel having a chemical composition which is adjusted in the above-described manner has an excellent resistance to temper softening at 500–550° C. compared to a conventional steel, and the decrease in hardness and corrosion resistance in this temperature range is extremely small.

The present invention was completed on the basis of these findings. According to one aspect of the present invention, a martensitic stainless steel for a disc brake rotor comprises, in mass percent, C:0.04–0.10%, Si: at most 1.0%, Mn: 0.1–2.0%, P: at most 0.04%, S: at most 0.01%, Cr: greater than 11.5 to 13.5%, Al: at most 0.1%, N: at most 0.04%, Cu: 0–1.0%, Ni: 0–1.0%, Ti: 0–0.03% and one or more of

Nb: 0.01–0.08% and V: 0.05–0.5%, and the value of GP expressed by the following formula is at least 50 (%):

$$GP(\%) = 700C(\%) + 800N(\%) + 20Ni(\%) + 10[Cu(\%) + Mn(\%)] - 6.2Cr(\%) - 9.2Si(\%) - 9.3Mo(\%) - 14V(\%) - 74.4Ti(\%) - 37.2Al(\%) + 63.2.$$

The steel may further include Mo: 0.05–1.0%.

In addition, the steel may include at least one of B, Ca, and Mg in a total amount of 0.0003–0.005%, and/or at least one of La, Ce, and Y in a total amount of 0.003–0.05%.

A steel according to the present invention is not restricted to use in a particular type of disc brake rotor. In working examples of the present invention, the case will be described in which the steel is formed into a disc brake rotor for a bicycle. Examples of other types of disc brake rotors to which the present invention can be applied are vehicles such as motorcycle, automobile and mountain bike.

DESCRIPTION OF PREFERRED EMBODIMENTS

Figure 1:
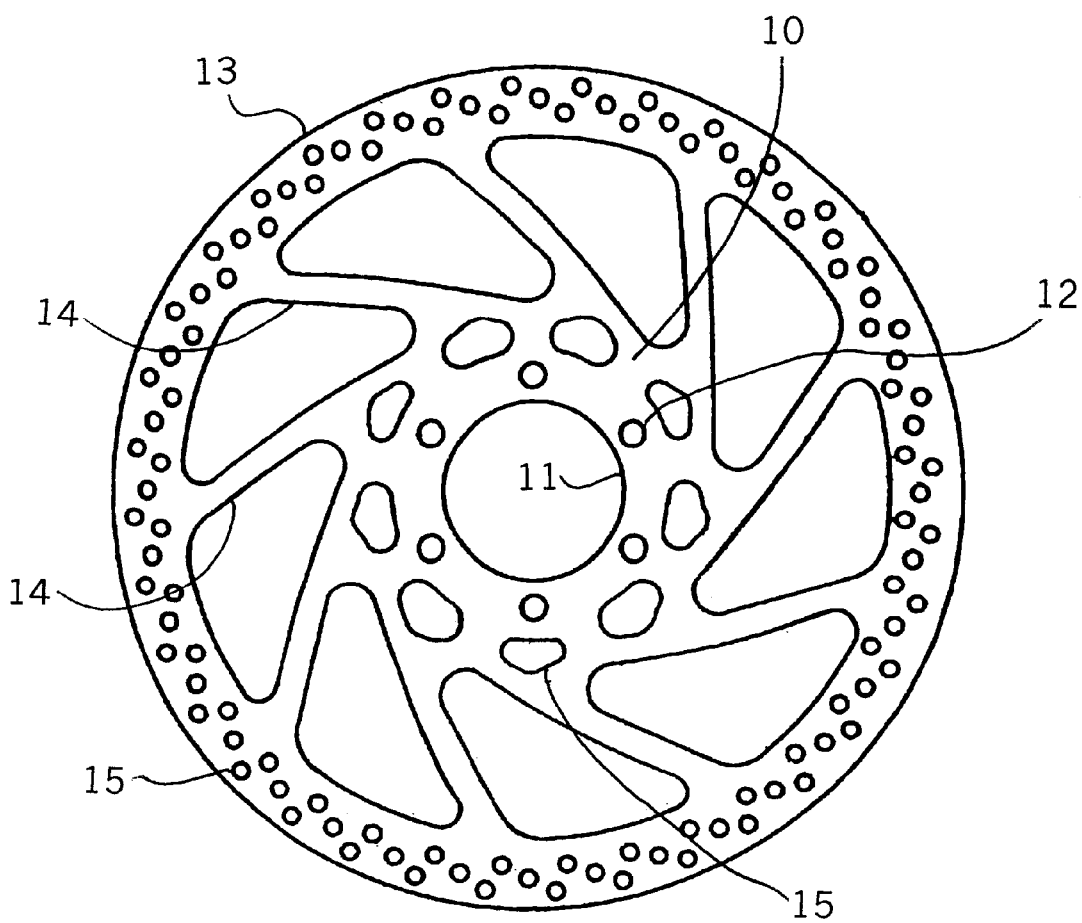
FIG. 1 is a plan view of a rotor for a disc brake formed in an example of the present invention.

The reasons for the range limitations on the various components of a steel according to the present invention and the functions of those components will next be described.

(a) C

C is added in order to give a steel high strength. It is necessary for the steel to contain at least 0.04% in order to guarantee the strength necessary for a disc brake rotor material. However, if too much C is added, the corrosion resistance of the steel deteriorates, and if the content exceeds 0.10%, when the cooling speed at the time of hardening is slow, Cr carbo-nitrides precipitate at grain boundaries, and it becomes impossible to guarantee a desired corrosion resistance. Accordingly, the C content is set at 0.04–0.10%. Preferably, the C content is 0.05–0.09%

(b) Si

Si is an essential element for deoxidation of steel, but when the deoxidation by Si is carried out entirely by Al, it is not necessary to add Si. Addition of too much Si produces a deterioration in the toughness of steel due to formation of delta ferrite or solid solution hardening so the Si content is made at most 1%. Preferably, the Si content is restricted to less than 0.50%.

(c) Mn

Mn is an essential element in connection with the deoxidation of steel. It also promotes the formation of austenite at high temperatures and increases hardenability. For these purposes, it is necessary to have an Mn content of at least 0.1%. However, excessive addition of Mn increases the solubility of sulfide inclusions in an aqueous solution environment, and it lowers the corrosion resistance of the steel, so the upper limit on the Mn content is made 2.0%. Preferably, the Mn content is 0.25–1.60%.

(d) P

P is an impurity which decreases the toughness of steel, so the amount thereof is preferably as small as possible. Under usual conditions, the P content is made at most 0.04%.

(e) S

S is an impurity which decreases the hot workability, corrosion resistance, and toughness of steel, so the amount thereof is preferably as small as possible. Under usual conditions, the S content is made at most 0.01%.

(f) Cr

Cr is an important component for maintaining the corrosion resistance of stainless steel. Even if expensive Mo is not added, it is necessary to guarantee a Cr content of greater than 11.5% in order to obtain the corrosion resistance necessary for a disc brake rotor material. On the other hand, a large amount of Cr promotes the precipitation of delta ferrite and brings about embrittlement of steel, so in light of cost and of suppressing this embrittlement, the upper limit on the Cr content is made 13.5%.

(g) Al

Al is an optional element. It may be intentionally added for the purpose of deoxidation of steel. However, it ability to perform deoxidation saturates at approximately 0.1%, so the Al content is made at most 0.1%.

(h) N

Together with C, N increases the hardness after hardening of steel. By adjusting the total amount of C and N, the hardness after hardening can be controlled. However, if too much N is added, the toughness of the steel deteriorates, so the N content is made at most 0.04%.

(i) Cu

Cu has the effect of additively increasing the corrosion resistance and strength of steel, so it may be added if desired. If the content thereof is greater than 1.0%, it brings about an increase in costs, so the Cu content is made 0–1.0%.

(j) Ni

Ni has the effect of improving corrosion resistance and toughness, so it may be added if desired. However, if the Ni content exceeds 1.0%, effects corresponding to the increase in costs cannot be expected, so the Ni content is set at 0–1.0%.

(k) Ti

Ti has an extremely strong affinity for N and C. It may be added if desired in order to control the micro structure by forming minute carbo-nitrides and increase toughness. If the Ti content exceeds 0.03%, coarse TiN is formed and the toughness markedly decreases, and the hardness of the steel also decreases. Therefore, the Ti content is made 0–0.03%.

(l) Nb and V

In the present invention, addition of one or both of Nb and V is essential for guaranteeing the corrosion resistance necessary for a disc brake rotor material. Nb and V have a strong affinity for C and N. When a disc brake rotor material is hardened, Nb and V segregate at austenite grain boundaries during the cooling stage, so the precipitation thereof slows down grain boundary precipitation of Cr carbides by attractive interaction between Nb, V and C, N. As a result, a deterioration in corrosion resistance due to a depletion of Cr is suppressed, and the present invention can guarantee a desired corrosion resistance even with a slow cooling rate.

As a result of various experiments, the present inventors found that the above-described effect of Nb and V is not expected in a steel in which more than a prescribed amount of delta ferrite is present.

Namely, the above-described value of GP is adjusted to at least 50 (%), and under this condition, by adding at least one of Nb in an amount of at least 0.01% and V in an amount of at least 0.05%, the precipitation of Cr carbo-nitrides can be suppressed, and an excellent corrosion resistance can be guaranteed.

On the other hand, if the content of Nb or V exceeds a prescribed value, Nb carbo-nitrides or V carbo-nitrides precipitate and coarsen at the soaking temperature at the time of hardening, leading to a decrease in the toughness of the steel and a decrease in hardness after hardening.

The Nb content at which the hardness after hardening begins to decrease is approximately 0.08% in the case in which the (C+N) content is on the high side and the hardening temperature is approximately 1000° C. When the (C+N) content is on the low side, the Nb content at which the hardness after hardening begins to decrease is at greater than 0.1%, but addition of a large amount of Nb increases the costs of the steel. Accordingly, the Nb content is made 0.01–0.08%.

If V is added in an amount of greater than 0.5%, the toughness of the steel decreases. Therefore, the V content is made 0.05–0.5%.

As described above, Nb and V have the same effect, but V has a greater solubility in steel than Nb, while V has a lesser effect on suppressing the speed of precipitation of Cr carbo-nitrides than Nb. Accordingly, by making the V content greater than that of Nb, the effect of increasing corrosion resistance is exhibited.

(m) GP

GP, which is expressed by the formula $$GP(\%) = 700C(\%) + 800N(\%) + 20Ni(\%) + 10[Cu(\%) + Mn(\%)] - 6.2Cr(\%) - 9.2Si(\%) - 9.3Mo(\%) - 14V(\%) - 74.4Ti(\%) - 37.2Al(\%) + 63.2.$$

is an index which qualitatively indicates the austenite phase ratio of the steel of the present invention at a high temperature. By making GP at least 50 (%) and thereby increasing the austenite phase ratio, it is possible to guarantee a desired corrosion resistance and toughness in a hardened steel. If GP is below 50 (%), the amount of delta ferrite increases, and when the cooling speed is slow at the time of hardening, the corrosion resistance of the steel decreases due to a Cr-depleted layer which is formed by the precipitation of Cr carbides at grain boundaries, and at the same time toughness is deteriorated.

(n) Mo

Mo is extremely effective in increasing the corrosion resistance and the temper resistance of stainless steel. In the steel of the present invention, corrosion resistance and temper resistance are further increased by the addition of Mo.

In order to obtain an improvement in corrosion resistance and temper resistance by the addition of Mo, the Mo content must be at least 0.05%. Taking into consideration the allowable costs of a disc rotor material, the upper limit on the Mo content is preferably 1.0%.

Accordingly, when Mo is added, the content is set to 0.05–1.0%, but in order to guarantee a marked effect by the addition of Mo, it is preferable that the content of Mo be at least 0.1%.

(o) B, Ca, Mg, La, Ce, and Y

One or more of these elements is preferably added in order to increase the hot workability of a steel according to the present invention. The total content of B, Ca, and Mg is preferably 0.0003–0.005%, while the total content of La, Ce, and Y is preferably 0.003–0.05%.

Oxygen (O), which is unavoidably mixed in during steel making, decreases the toughness of steel, so it is necessary to decrease the content thereof as much as possible by deoxidation using Si or Al or the like. Preferably the O content is decreased to a range of 0.006% or less. If the oxygen content is reduced to this range, a steel according to the present invention can exhibit a toughness which is fully satisfactory for a disc brake rotor material.

Next, the present invention will be described more concretely by the following examples, which are merely illustrative and are not intended to limit the scope of the present invention.

EXAMPLES

Example 1

First, stainless steels having the compositions shown in Table 1 were prepared in a vacuum high frequency induction furnace, and round ingots weighing 25 kilograms were cast.

TABLE 1

| Steel | Chemical Composition (mass %) | | | | | | | | | | |
|---|---|---|---|---|---|---|---|---|---|---|---|
| | C | S | Mn | P | S | Cu | Ni | Cr | Mo | Ti | V |
| Present Invention | | | | | | | | | | | |
| 1 | 0.07 | 0.30 | 0.80 | 0.025 | 0.001 | 0.01 | 0.25 | 12.2 | — | 0.001 | 0.01 |
| 2 | 0.07 | 0.31 | 0.74 | 0.021 | 0.001 | 0.35 | 0.30 | 12.1 | — | 0.002 | 0.06 |
| 3 | 0.06 | 0.35 | 0.82 | 0.025 | 0.004 | 0.01 | 0.20 | 11.8 | — | 0.001 | 0.21 |
| 4 | 0.05 | 0.26 | 1.54 | 0.018 | 0.001 | 0.01 | 0.10 | 12.3 | — | 0.002 | 0.01 |
| 5 | 0.09 | 0.45 | 0.60 | 0.013 | 0.002 | 0.01 | 0.05 | 11.8 | — | 0.002 | 0.04 |
| 6 | 0.08 | 0.02 | 0.25 | 0.020 | 0.005 | 0.35 | 0.85 | 12.2 | — | 0.015 | 0.08 |
| 7 | 0.06 | 0.25 | 1.30 | 0.024 | 0.001 | 0.80 | 0.15 | 13.2 | — | 0.002 | 0.09 |
| 8 | 0.08 | 0.21 | 0.78 | 0.019 | 0.001 | 0.45 | 0.35 | 11.8 | 0.35 | 0.003 | 0.40 |
| 9 | 0.07 | 0.28 | 0.82 | 0.018 | 0.001 | 0.01 | 0.18 | 11.7 | 0.51 | 0.004 | 0.06 |
| 10 | 0.07 | 0.30 | 0.81 | 0.025 | 0.003 | 0.34 | 0.36 | 12.2 | — | 0.003 | 0.08 |
| 11 | 0.07 | 0.31 | 0.80 | 0.023 | 0.003 | 0.35 | 0.35 | 12.2 | — | 0.004 | 0.08 |
| 12 | 0.07 | 0.31 | 0.80 | 0.024 | 0.003 | 0.35 | 0.35 | 11.8 | 0.35 | 0.003 | 0.08 |
| 13 | 0.07 | 0.30 | 0.79 | 0.023 | 0.003 | 0.34 | 0.36 | 12.2 | — | 0.004 | 0.08 |
| 14 | 0.07 | 0.29 | 0.80 | 0.025 | 0.002 | 0.35 | 0.35 | 12.2 | — | 0.004 | 0.08 |
| 15 | 0.07 | 0.30 | 0.81 | 0.024 | 0.003 | 0.34 | 0.36 | 12.2 | — | 0.003 | 0.08 |
| 16 | 0.07 | 0.31 | 0.80 | 0.025 | 0.001 | 0.35 | 0.25 | 12.2 | — | -(0.00) | 0.01 |
| 17 | 0.07 | 0.30 | 0.79 | 0.023 | 0.001 | 0.35 | -(0.00) | 12.0 | — | 0.004 | 0.01 |
| 18 | 0.07 | 0.31 | 0.80 | 0.024 | 0.001 | -(0.00) | 0.25 | 11.8 | — | 0.003 | 0.01 |
| 19 | 0.07 | 0.30 | 0.79 | 0.026 | 0.001 | -(0.00) | -(0.00) | 11.8 | — | -(0.00) | 0.01 |
| Comparative | | | | | | | | | | | |
| 20 | 0.07 | 0.15 | 0.80 | 0.031 | 0.005 | 0.02 | 0.25 | 11.8 | — | 0.001 | *0.01 |
| 21 | 0.07 | 0.28 | 0.71 | 0.023 | 0.001 | 0.40 | 0.22 | 12.3 | — | 0.002 | 0.85 |
| 22 | 0.08 | 0.25 | 0.68 | 0.023 | 0.005 | 0.02 | 0.35 | 12.2 | — | 0.001 | *0.01 |
| 23 | 0.07 | 0.32 | 0.85 | 0.022 | 0.003 | 0.01 | 0.28 | *11.0 | — | 0.001 | 0.08 |
| 24 | 0.06 | 0.31 | 0.76 | 0.021 | 0.002 | 0.01 | 0.31 | 13.9 | — | 0.012 | 0.08 |
| 25 | *0.03 | 0.33 | 0.84 | 0.026 | 0.003 | 0.01 | 0.34 | 12.1 | — | 0.003 | 0.01 |
| 26 | *0.13 | 0.30 | 0.42 | 0.022 | 0.001 | 0.01 | 0.29 | 12.2 | — | 0.014 | 0.06 |
| 27 | 0.07 | 0.32 | 0.79 | 0.016 | 0.005 | 0.01 | 0.36 | 12.1 | — | 0.003 | 0.05 |
| 28 | 0.07 | 0.29 | 0.83 | 0.021 | 0.003 | 0.02 | 0.28 | 12.3 | — | *0.051 | *0.04 |

| Steel | Chemical Composition (mass %) | | | | | | | | | | |
|---|---|---|---|---|---|---|---|---|---|---|---|
| | Nb | Al | O | N | B | Ca | Mg | La | Ce | Y | Value |
| Present Invention | | | | | | | | | | | |
| 1 | 0.035 | 0.001 | 0.003 | 0.015 | — | — | — | — | — | — | 58.8 |
| 2 | 0.036 | 0.001 | 0.002 | 0.011 | — | — | — | — | — | — | 59.8 |
| 3 | 0.001 | 0.015 | 0.004 | 0.017 | — | — | — | — | — | — | 54.1 |
| 4 | 0.025 | 0.002 | 0.002 | 0.035 | — | — | — | — | — | — | 64.8 |
| 5 | 0.028 | 0.002 | 0.003 | 0.028 | — | — | — | — | — | — | 78.2 |
| 6 | 0.035 | 0.031 | 0.002 | 0.011 | — | — | — | — | — | — | 72.9 |
| 7 | 0.065 | 0.001 | 0.004 | 0.033 | — | — | — | — | — | — | 71.3 |
| 8 | 0.002 | 0.001 | 0.003 | 0.016 | — | — | — | — | — | — | 72.7 |
| 9 | 0.031 | 0.001 | 0.004 | 0.025 | — | — | — | — | — | — | 63.9 |
| 10 | 0.036 | 0.001 | 0.003 | 0.015 | 0.0023 | — | — | — | — | — | 64.2 |
| 11 | 0.035 | 0.032 | 0.002 | 0.016 | — | 0.0021 | — | — | — | — | 63.5 |
| 12 | 0.035 | 0.024 | 0.002 | 0.015 | — | — | 0.0015 | — | — | — | 62.3 |
| 13 | 0.036 | 0.072 | 0.002 | 0.016 | — | — | — | 0.035 | — | — | 62.1 |
| 14 | 0.035 | 0.065 | 0.002 | 0.016 | — | — | — | — | 0.028 | — | 62.5 |
| 15 | 0.036 | 0.082 | 0.001 | 0.015 | — | — | — | — | — | 0.012 | 62.1 |
| 16 | 0.035 | 0.001 | 0.003 | 0.015 | — | — | — | — | — | — | 62.2 |
| 17 | 0.035 | 0.001 | 0.003 | 0.015 | — | — | — | — | — | — | 58.1 |
| 18 | 0.034 | 0.001 | 0.003 | 0.015 | — | — | — | — | — | — | 60.9 |
| 19 | 0.035 | 0.001 | 0.003 | 0.015 | — | — | — | — | — | — | 56.1 |
| Comparative | | | | | | | | | | | |
| 20 | *0.001 | 0.008 | 0.003 | 0.022 | — | — | — | — | — | — | 68.1 |
| 21 | *0.001 | 0.001 | 0.004 | 0.022 | — | — | — | — | — | — | 66.3 |
| 22 | *0.15 | 0.001 | 0.003 | 0.036 | — | — | — | — | — | — | 83.9 |

TABLE 1-continued

| | | | | | | | | | | | |
|---|---|---|---|---|---|---|---|---|---|---|---|
| 23 | 0.001 | 0.001 | 0.003 | 0.021 | — | — | — | — | — | — | 71.9 |
| 24 | 0.029 | 0.001 | 0.003 | 0.018 | — | — | — | — | — | — | *43.5 |
| 25 | 0.038 | 0.001 | 0.003 | 0.025 | — | — | — | — | — | — | *41.2 |
| 26 | 0.001 | 0.001 | 0.003 | 0.009 | — | — | — | — | — | — | 92.0 |
| 27 | 0.034 | 0.001 | 0.003 | 0.012 | — | — | — | — | — | — | 58.8 |
| 28 | 0.037 | 0.001 | 0.004 | 0.016 | — | — | — | — | — | — | 56.3 |

Note:
The balance of chemical composition is Fe and incidental impurities.
*: Outside the range of the present invention Next, hot forging, hot rolling, temper annealing, and cold rolling were carried out by conventional methods to obtain cold rolled steel plates having a thickness of 1.8 mm.

A test piece for hardening heat treatment measuring 1.8 mm thick by 50 mm wide by 25 mm long was taken from each cold rolled steel plate, soaking was carried out at 1000° C. for three minutes in a heating furnace employing infrared heating, and then hardening heat treatment was carried out by cooling at a slow cooling temperature of 0.5° C. per second.

The properties of the as-hardened steel plate obtained by this hardening heat treatment were investigated.

A sub-size Charpy test piece (1.8 mm thick×55. mm wide×10 mm long) with a 2-mm V-notch was taken from the above-described cold rolled steel plates for evaluation of impact properties, and hardening heat treatment was carried out by the same method.

In order to evaluate the properties of the as-hardened steel plate, the hardness of a cross section, the pitting potential, and the impact value of the material which had been subjected to hardening heat treatment were evaluated.

The hardness of a cross section was measured by a Vickers hardness test at a load of 98 N, and was evaluated as the average of 5 points.

The pitting potential was evaluated by replacing the test solution set forth in JIS G 0577 with 0.5% NaCl at 35° C., a saturated calomel electrode (SCE) was used as a reference electrode, and the average of 3 measurements of pitting potential Vc' (100) was evaluated.

The impact value was evaluated by taping two of the sub-size Charpy test pieces to each other after hardening heat treatment with double-sided tape to obtain a test piece with a thickness of 3.6 mm, and an impact test was carried out at 0° C. to obtain an impact value.

The results of measurement are shown in Table 2.

TABLE 2

Properties of Cold Rolled Steel Plate

| | As-hardened | | | After Tempering | | | |
|---|---|---|---|---|---|---|---|
| | | | | Hardness [Hv98N] | | ΔHv (As-hardened) − (Tempered at) | Vc' (100) Tempered at |
| Steel | Hardness | Vc' (100) [VvsSCE] | Impact Value [J/cm²] | 500° C. | 550° C. | 550° C. | 500° C. |
| Present Invention | | | | | | | |
| 1 | 378 | 0.15 | 105 | 384 | 372 | 6 | 0.12 |
| 2 | 372 | 0.16 | 103 | 378 | 362 | 10 | 0.14 |
| 3 | 361 | 0.14 | 92 | 365 | 356 | 5 | 0.11 |
| 4 | 374 | 0.12 | 86 | 377 | 366 | 8 | 0.10 |
| 5 | 412 | 0.11 | 75 | 415 | 400 | 12 | 0.10 |
| 6 | 385 | 0.14 | 116 | 390 | 378 | 7 | 0.12 |
| 7 | 384 | 0.18 | 98 | 388 | 380 | 4 | 0.17 |
| 8 | 391 | 0.17 | 96 | 399 | 387 | 4 | 0.14 |
| 9 | 398 | 0.18 | 82 | 412 | 393 | 5 | 0.15 |
| 10 | 382 | 0.14 | 103 | 386 | 373 | 9 | 0.11 |
| 11 | 384 | 0.13 | 76 | 388 | 376 | 8 | 0.10 |
| 12 | 383 | 0.15 | 81 | 385 | 376 | 7 | 0.12 |
| 13 | 380 | 0.14 | 72 | 383 | 370 | 10 | 0.11 |
| 14 | 379 | 0.13 | 74 | 384 | 371 | 8 | 0.10 |
| 15 | 375 | 0.13 | 68 | 380 | 366 | 9 | 0.11 |
| 16 | 381 | 0.15 | 121 | 390 | 378 | 3 | 0.13 |
| 17 | 370 | 0.14 | 83 | 376 | 363 | 7 | 0.12 |
| 18 | 375 | 0.14 | 95 | 381 | 370 | 5 | 0.12 |
| 19 | 366 | 0.13 | 71 | 372 | 357 | 9 | 0.10 |

TABLE 2-continued

Properties of Cold Rolled Steel Plate

| | As-hardened | | | After Tempering | | | |
|---|---|---|---|---|---|---|---|
| | | | | Hardness [Hv98N] | | ΔHv (As-hardened) − (Tempered at | Vc' (100) Tempered at |
| Steel | Hardness | Vc' (100) [VvsSCE] | Impact Value [J/cm²] | 500° C. | 550° C. | 550° C. | 500° C. |
| Comparative | | | | | | | |
| 20 | 378 | 0.04 | 68 | 385 | 368 | 20 | 0.02 |
| 21 | 374 | 0.11 | 35 | 380 | 370 | 4 | 0.09 |
| 22 | 324 | 0.12 | 26 | 320 | 300 | 24 | 0.08 |
| 23 | 385 | 0.03 | 89 | 390 | 376 | 9 | 0.01 |
| 24 | 352 | 0.05 | 28 | 350 | 335 | 17 | 0.01 |
| 25 | 324 | 0.04 | 33 | 320 | 312 | 12 | −0.01 |
| 26 | 426 | −0.21 | 41 | 420 | 395 | 31 | −0.25 |
| 27 | 384 | 0.01 | 39 | 390 | 379 | 5 | −0.03 |
| 28 | 350 | 0.12 | 21 | 350 | 342 | 8 | 0.10 |

In this example, the conditions during use (at the time of braking) of a disc brake rotor were simulated, and in order to evaluate the changes in material properties resulting from these conditions, the properties of the above-described steel plates which had been subjected to hardening heat treatment and tempering treatment were also investigated.

In order to evaluate the properties of the steel plates after tempering, the hardness (Hv) of a cross section of a material which had undergone tempering treatment with air cooling after being maintained at 500° C. for one hour and of a material which had been subjected to tempering with air cooling after being maintained at 550° C. for one hour, the difference in hardness ($\Delta H_V$) between an as-hardened material and a material tempered at 550° C., and the pitting potential [Vc' (100)] of a material subjected to tempering with air cooling after being maintained at 500° C. for 1 hour were evaluated.

The results of measurements are also shown in Table 2.

As is clear from the results shown in Table 2, a martensitic stainless steel according to this invention has an as-hardened corrosion resistance with a pitting potential of at least 0.1V (vsSCE), and it has a high impact value of greater than 50J/cm².

Furthermore, the decrease in hardness $\Delta H_V$ resulting from a rise in temperature up to 550° C. after hardening heat treatment was less than 15, and the corrosion resistance after heat treatment at 500° C. following hardening heat treatment was also maintained at a good level.

From these results, it is clear that a martensitic stainless steel according to the present invention has excellent properties as a disc brake rotor material.

Example 2

Figure 2:
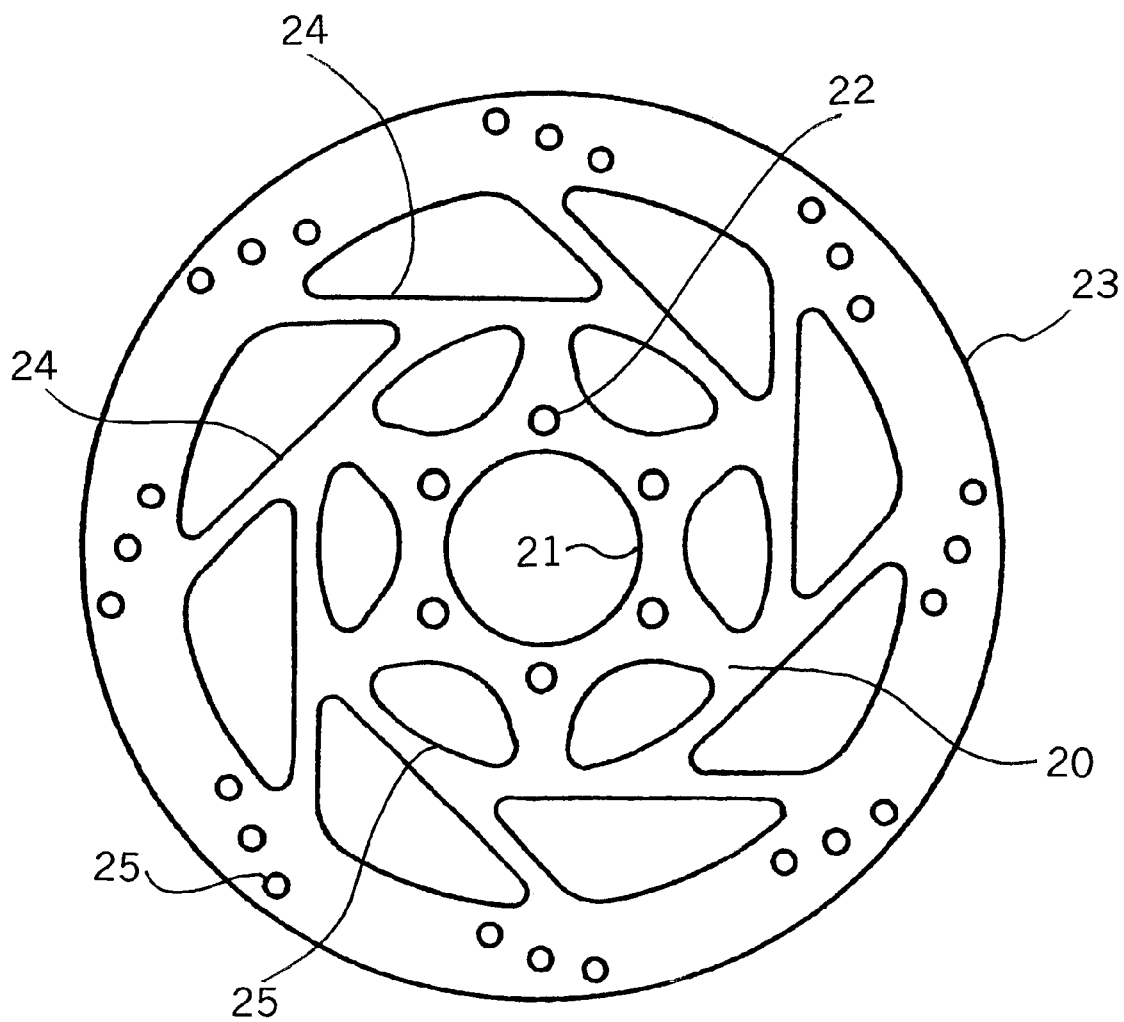
FIG. 2 is a plan view of a rotor for a disc brake having a somewhat different shape formed in an example of the present invention.

For each steel type, a number of disc brake rotors having the shapes shown in FIG. 1 and FIG. 2 were punched out from cold rolled steel plate having a thickness of 1.8 mm prepared in the manner described in Example 1.

In addition, a number of disc brake rotors having the shape shown in FIG. 1 were punched out from a commercially available plate of SUS 420J2 steel.

The rotor shown in FIG. 1 includes a hub 10 having a central hole 11 and a plurality of installation holes 12 disposed at intervals around the central hole 11, an annular rim 13, and a plurality of arms 14 rigidly connecting the hub to the rim. Weight reducing holes 15 of various sizes and shapes may be formed in one or both of the hub 10 and the rim 13. Similarly, the rotor of FIG. 2 includes a hub 20 having a central hole 21 and installation holes 22, an annular rim 23, arms 24 rigidly connecting the hub 20 to the rim 23, and weight reducing holes 25 formed the hub 20 and the rim 23. The illustrated rotors are just two examples of many possible shapes of a rotor to which a steel according to the present can be applied.

These rotors were then subjected to hardening heat treatment.

Prior to hardening heat treatment, 100 of the rotors were stacked to form a bundle in order to suppress a deterioration in flatness due to hardening, and the bundle was clamped by stainless steel bolts and nuts. The bundle of stacked rotors had the shape of a cylindrical block with an outer diameter of 160 mm and a height of approximately 180 mm.

Hardening heat treatment was carried out by placing the cylindrical block of stacked rotors in a heating furnace to carry out soaking in a atmosphere having a temperature of 1020° C. for one hour, and then gas cooling was carried out. At this time, the cooling speed from 900–600° C. was approximately 30° C. per minute.

The rotors were then subjected to flattening and surface grinding to obtain finished disc brake rotors.

The corrosion resistance, strength, and ductility of the rotors was then evaluated.

Corrosion resistance was evaluated by using the above-described rotors as a test material, and using the salt spray test method set forth in JIS Z 2371, a 3.5% NaCl aqueous solution at 35° C. was sprayed for 24 hours, and after the test the degree of rust formation on the rotor surface was determined by a method performing relative comparison.

Strength and ductility were measured by bolting rotors having the shape shown in FIG. 1 and FIG. 2 to a fixed member with bolts passing through the installation holes formed in six locations along in the inner periphery of the rotors and nuts secured to the bolts. A fitting was mounted on a hole at one location in the outer peripheral portion (at a location 75.5 mm from the rotational axis). The fitting was forcefully displaced in the circumferential direction, and a curve of displacement versus torque was measured. The displacement at which the torque abruptly decreased due to failure was measured.

When a rotor is forcefully displaced in the above-described manner in the circumferential direction, the torque initially increases linearly as the circumferential displacement increases, but then the torque decreases when the arms which connect the hub and the rim begin to buckle, and then the torque abruptly decreases when the arms fail at a certain circumferential displacement. The displacement at which the torque abruptly decreases due to failure was measured.

The displacement at which the torque abruptly decreases due to failure was measured for ten rotors having the shape shown in FIG. 1 for each of the steels shown in Table 1, and for ten rotors of the shape shown in FIG. 2 for each the steels shown in Table 1.

A small amount of dot shaped occurrences of rust were found on the surface of the rotors of the steel according to the present invention (steels 1–19 of Table 1), but the dots were extremely small, and they had not become flowing rust, i.e., linear rust.

Among the comparative steels, rotors made from steels 21, 22, and 28 of Table 1 had the same corrosion resistance as rotors made of steels according to the present invention.

In contrast, except for steels 21, 22, and 28, the extent of occurrence of rust increased in rotors made from the comparative steels of Table 1, and pitting accompanying flowing rust was observed in rotors made from steel 30.

The results of the evaluation of strength and ductility were as follows.

Rotors made of steels according to the present invention (steels 1–19 of Table 1) deformed in a ductile manner after a maximum torque value was exceeded for 20 mm, so it was ascertained that they had adequate strength and ductility.

In contrast, with the exception of rotors made from steels 20 and 23 of Table 1, among the rotors made from the comparative steels, there were those in which the weakest arm failed before a displacement of 20 mm was imparted. There is a tendency for ductility to be higher with softer materials, and while there is not always a direct correspondence with toughness, if one compares at the same hardness, in steels having an impact value of less than or equal to 50 J/cm$^2$ like the comparative steels except for steel 20 and 23 of Table 1, although there was a small probability of this occurring, there were those in which the torque abruptly increased due to failure of an arm during deformation of up to a displacement of 20 mm.

From the above experimental results, it is clear that a disc brake rotor manufactured from a steel according to the present invention can exhibit excellent corrosion resistance, strength, and ductility during conditions of actual use.

As explained above, according to the present invention, the range of the cooling speed of hardening heat treatment for obtaining a disc brake rotor can be expanded towards the low speed side, and an excellent corrosion resistance can be maintained even when the temperature of a disc brake rotor rises to 500–550° C. due to heat generated during braking.

The present invention, therefore, has the industrially useful effects that it can provide a low cost martensitic stainless steel which can be used to form a rotor which can stably guarantee an excellent corrosion resistance, toughness, and hardness even when the rotor is slowly cooled in order to decrease strains caused by hardening heat treatment, or when it is necessary to combine a large number of rotors into a bundle and cool them slowly, or when the rotor has a thick cross section which necessitates a slow cooling speed during hardening heat treatment.

What is claimed is:

1. A martensitic stainless steel for a disc brake rotor comprising, in mass percent, C: 0.04–0.10%, Si: at most 1.0%, Mn: 0.1–2.0%, P: at most 0.04%, S: at most 0.01%, Cr: greater than 11.5 to 13.5%, Al: at most 0.1%, N: at most 0.04%, Cu: 0–1.0%, Ni: 0–1.0%, Ti: 0–0.03%, Mo: 0–1% and one or more of

Nb: 0.01–0.08% and V: 0.05–0.5%, wherein the value of GP expressed by the following formula is at least 50 (%):

$$GP(\%) = 700C(\%) + 800N(\%) + 20Ni(\%) + 10[Cu(\%) + Mn(\%)] - 6.2Cr(\%) - 9.2Si(\%) - 9.3Mo(\%) - 14V(\%) - 74.4Ti(\%) - 37.2Al(\%) + 63.2.$$

2. A martensitic stainless steel as claimed in claim 1, further comprising Mo: 0.05–1.0%.

3. A martensitic stainless steel as claimed in claim 1, further comprising: at least one of B, Ca, and Mg in a total amount of 0.0003–0.005%, and/or at least one of La, Ce, and Y in a total amount of 0.003–0.05%.

4. A disc brake rotor made from the steel of claim 1.

5. A disc brake rotor made from the steel of claim 2.

6. A disc brake rotor made from the steel of claim 3.

7. A vehicle equipped with the disc brake rotor of claim 4.

8. A vehicle equipped with the disc brake rotor of claim 5.

9. A vehicle equipped with the disc brake rotor of claim 6.

10. A bicycle equipped with the disc brake rotor of claim 4.

11. A bicycle equipped with the disc brake rotor of claim 5.

12. A bicycle equipped with the disc brake rotor of claim 6.

13. A martensitic stainless steel as claimed in claim 2, further comprising: at least one of B, Ca, and Mg in a total amount of 0.0003–0.005%, and/or at least one of La, Ce, and Y in a total amount of 0.003–0.05%.

* * * * *